United States Patent
Diaz Pabon (10) Patent No.: US 10,311,051 B1
(45) Date of Patent: Jun. 4, 2019

(54) STORING MODELING ALTERNATIVES WITH UNITIZED DATA

(71) Applicant: Bentley Systems, Incorporated, Exton, PA (US)

(72) Inventor: Diego A. Diaz Pabon, West Hartford, CT (US)

(73) Assignee: Bentley Systems, Incorporated, Exton, PA (US)

(*) Notice: Subject to any disclaimer, the term of this patent is extended or adjusted under 35 U.S.C. 154(b) by 345 days.

(21) Appl. No.: 14/167,645

(22) Filed: Jan. 29, 2014

(51) Int. Cl.
*G06F 16/00* (2019.01)
*G06F 16/245* (2019.01)

(52) U.S. Cl.
CPC .................. *G06F 16/245* (2019.01)

(58) Field of Classification Search
CPC ................................................ G06F 17/30424
See application file for complete search history.

(56) References Cited

U.S. PATENT DOCUMENTS

| | | | |
|---|---|---|---|
| 5,535,386 A * | 7/1996 | Wang ........................ | G06F 8/71 |
| 7,107,280 B2 | 9/2006 | Tomic et al. | |
| 8,190,648 B1 | 5/2012 | Tomic et al. | |
| 2003/0217063 A1* | 11/2003 | Tomic ............... | G06F 17/30286 |
| 2004/0011020 A1* | 1/2004 | Nomura ................ | F01D 17/162 |
| | | | 60/39.281 |
| 2004/0143588 A1* | 7/2004 | Russell ..................... | G11C 5/04 |
| 2005/0228624 A1* | 10/2005 | Lachman ................ | B63B 9/002 |
| | | | 703/9 |
| 2010/0106684 A1* | 4/2010 | Pizzo ................ | G06F 17/30581 |
| | | | 707/610 |
| 2014/0101132 A1* | 4/2014 | Konik ............... | G06F 17/30442 |
| | | | 707/718 |
| 2014/0300758 A1* | 10/2014 | Tran ........................ | H04N 5/225 |
| | | | 348/207.1 |

OTHER PUBLICATIONS

"Bentley Hammer V8i Edition User's Guide," Bentley Systems, Incorporated, Nov. 2009. pp. 1-1062.
"Bentley WaterCAD V8i User's Guide," Bentley Systems, Incorporated, Nov. 2009, pp. 1-1289.
"Bentley WaterGEMS V8i User's Guide," Bentley Systems, Incorporated, Nov. 2009, pp. 1-1380.

* cited by examiner

*Primary Examiner* — Sherief Badawi
*Assistant Examiner* — Lahcen Ennaji
(74) *Attorney, Agent, or Firm* — Cesari and McKenna, LLP; James A. Blanchette (57) ABSTRACT

In one embodiment, a relational database is structured so that elements and alternatives directly reference parameter values stored in a unitized data store. No intermediary tables are required between the elements, the alternatives, and the parameter values. Further, a level tracking mechanism is employed among alternatives that allows for efficient bulk-data retrieval, for example, via a single database query. In one type of operation, an element of a system model is accessed. A selected scenario is accessed that references a plurality of alternatives that exist among a larger plurality of alternatives. Parameter values are retrieved from the unitized data store based on a direct reference from the element and a referenced alternative of the selected scenario. The unitized data store includes values for the larger plurality of alternatives. The retrieved parameter values are used in executing the system model.

20 Claims, 6 Drawing Sheets

```
SELECT    ElementID, Values
FROM      Element AS e, Alternative AS a, Alternative Data AS ad
WHERE     e.ElementID = ad.ElementID AND a.AlternativeID = ad.AlternativeID AND
          e.Type =<element type> AND a.AlternativeID IN (<list of alternativeIDs in hierarchy>)
GROUP BY  e. ElementID
HAVING    MAX(a.Level)= a.Level
```

FIG. 4

```
520 {  SELECT    ElementID, Values
       FROM (SELECT    ElementID, Values
        FROM      Element AS e, Alternative AS a, Alternative Data AS ad
        WHERE     e.ElementID = ad.ElementID AND a.AlternativeID = ad.AlternativeID AND
510              e.Type =<element type> AND a.AlternativeID IN (<list of alternativeIDs in hierarchy>)
        GROUP BY  e. ElementID
        HAVING    MAX(a.Level)= a.Level
       ) AS AlternativeDataRows 520 {  WHERE     <AlternativeDataRows. Values-based filter criteria>
       ORDER BY  <AlternativeDataRows -Based sort criteria>
```

FIG. 5

```
620 ⎧ SELECT    ElementID, <Alternative Type 1 Values> ..., <AlternativeType n Values>
    ⎩ FROM (SELECT   ElementID, Values
       FROM     Element AS e, <Alternative Type 1> AS a, AlternativeData AS ad
610    WHERE    e.ElementID = ad.ElementID AND a.AlternativeID = ad.AlternativeID AND
                e.Type =<element type> AND
                a.AlternativeID IN (<list of alternativeIDs in alternative type 1's hierarchy>)
       GROUP BY e. ElementID
       HAVING   MAX(a.Level)= a.Level
      ) AS Alternative_1_DataRows, (SELECT   ElementID, Values
       FROM     Element AS e, <Alternative Type n> AS a, AlternativeData AS ad
610    WHERE    e.ElementID = ad.ElementID AND a.AlternativeID = ad.AlternativeID AND
                e.Type =<element type> AND
                a.AlternativeID IN (<list of alternativeIDs in alternative type n's hierarchy>)
       GROUP BY e. ElementID
       HAVING   MAX(a.Level)= a.Level
      ) AS Alternative_n_DataRows, 620 ⎧ WHERE     <Alternative_1_DataRows ElementID = ... =Alternative_n_ DataRows ElementID
                AND < DataRows.Values-based filter criteria>
    ⎩ ORDER BY  <DataRows -based sort criteria>
```

FIG. 6  — 600

STORING MODELING ALTERNATIVES WITH UNITIZED DATA

BACKGROUND

Technical Field

The present disclosure relates generally to modeling an engineered system, and more specifically to techniques for storing modeling alternatives used in execution of a system model of an engineered system.

Background Information

Engineers and other professionals commonly create system models of engineered systems (i.e., physical systems created through engineering design). Such models are generally composed of elements that represent portions of the overall system. For example, hydraulic engineers may create system models of hydraulic systems (e.g., water distribution networks, wastewater collection networks, etc.) having elements that represent pipes, pumps, valves, storage tanks, junctions, and the like. After creating a system model, an engineer may exercise it by testing various "what if" cases. In a "what if" case, values of certain parameters related to the system model and its elements are changed from initial values, and the system model executed (e.g., simulated) to evaluate the impact of the changes. The parameters may describe things such as topology, physical properties, demands, initial settings, etc. Generally, testing of "what if" cases is iterative, with the values of certain parameters being changed, the system model being executed, results being analyzed, the values being changed again, the system being model being executed again, the new results being analyzed, and so forth.

Traditionally, the iterative evaluation of "what if" cases has required significant data duplication. To evaluate a particular "what if" case, a data set including parameter values being changed would be copied from its original storage location to a working area in memory, creating a working copy. The working copy would be modified and then used to execute the system model. While this sort of approach is functional, it is highly inefficient.

Certain advances have been made to reduce the data duplication inherent to traditional approaches that use working copies. One newer approach uses "scenarios" composed of "alternatives" based on "facets", to enable data sharing. In such an approach, data storage may be unitized so that there is a single persistent location for storing parameter values. In order to access parameter values, special intermediary tables (e.g., alternative record tables) are utilized. The intermediary tables (e.g., "alternative record tables") generally relate elements and alternatives to record identifiers. Due to the usage of intermediary tables (e.g., alternative record tables) this approach is referred to hereinafter as the "alternative record approach". Further details of the alternative record approach may be found in commonly assigned U.S. Pat. No. 7,107,280 by Tomic et al., filed on May 12, 2002 and commonly assigned U.S. Pat. No. 8,190,648 by Tomic et al. filed on May 19, 2005, both of which are incorporated by reference herein in their entirety.

While the alternative record approach represented a significant advance over traditional approaches that used working copies, allowing for more efficient usage of memory resources, certain areas have been noted where it could be further improved. For example, it has been noted that the intermediary tables (e.g., alternative record tables) consume a large amount of memory resources. The number of rows in an intermediary table (e.g., alternative record table) typically grows in a combinatorial manner, as a function of the number of elements in the system model and the number of alternatives. As a result, for large system models with many alternatives, the memory footprint consumed by intermediary tables (e.g., alternative record tables) may be substantial. Further, use of intermediary tables (e.g., alternative record tables) may negatively affect performance when bulk-data retrieval queries are executed. Still further, use of intermediary tables (e.g., alternative record tables) may negatively affect performance when elements are added to system models.

Accordingly, there is a need for an improved approach that may address some or, all of, these issues.

SUMMARY

In one embodiment, a relational database is structured so that elements and alternatives directly reference parameter values stored in a unitized data store. No intermediary tables (e.g., alternative record tables) are required between the elements, the alternatives, and the parameter values. Further, a level tracking mechanism is employed among alternatives that allows for efficient bulk-data retrieval, despite the absence of intermediary tables (e.g., alternative record tables). Such efficient bulk-data retrieval may be achieved, for example, via a single database query.

More specifically, elements, scenarios, alternatives, and parameter values are maintained respectively in an element table, a scenario table, an alternative table, and a unitized alternative data table of a relational database. The element table stores element IDs that each uniquely identify an element, and element types that each indicate a general category to which the element belongs. The scenario table stores scenario IDs that each identify a scenario, and related to each scenario ID, a number of alternative IDs that indicate alternatives represented in that scenario. Multiple different scenario IDs may be associated with some of the same alternative IDs, allowing different scenarios to share alternatives.

The alternative table includes alternative IDs corresponding to those in the scenario table, as well as alternative types, parent IDs, and special level IDs. Using the alternative IDs, alternatives in the alternative table may be referenced from the scenario table. The alternatives are organized into an alternative-hierarchy based on a series of parent-child relationships among alternatives. The parent IDs may indicate a parent of an alternative. The special level IDs may indicate a level within the alternative-hierarchy. An explicit indication of such level enables certain efficiencies in operation, for example, bulk-data retrieval operations.

The unitized alternative data table operates as a unitized data store, and includes alternative IDs, element IDs, and parameter values. Together the alternative IDs and element IDs form alternative ID-element ID pairs that permit the parameter values to be directly referenced from the element table and the alternative table.

In operation, to evaluate a "what if" case, an element of the system model is accessed in the element table. Further, a selected scenario in the scenario table is accessed that references a plurality of alternatives in the alternative table. Parameter values for the selected scenario are retrieved from the unitized alternative data table based on a direct reference from the element of the system model and a referenced alternative of the selected scenario. Using the retrieved parameter value, and other parameter values retrieved in a similar manner, a system model may be executed (i.e. simulated).

It should be understood that this Summary is intended simply as a brief introduction to the reader. Further details regarding the example embodiment discussed in the Summary, and other example embodiments, may be found in the Detailed Description below. Mention of specific features in this Summary does not indicate or imply that they are necessary or essential aspects of the invention, or preclude the presence of other features in the invention.

BRIEF DESCRIPTION OF THE DRAWINGS

The Detailed Description below refers to the accompanying drawings of example embodiments, of which.

DETAILED DESCRIPTION

Figure 1:
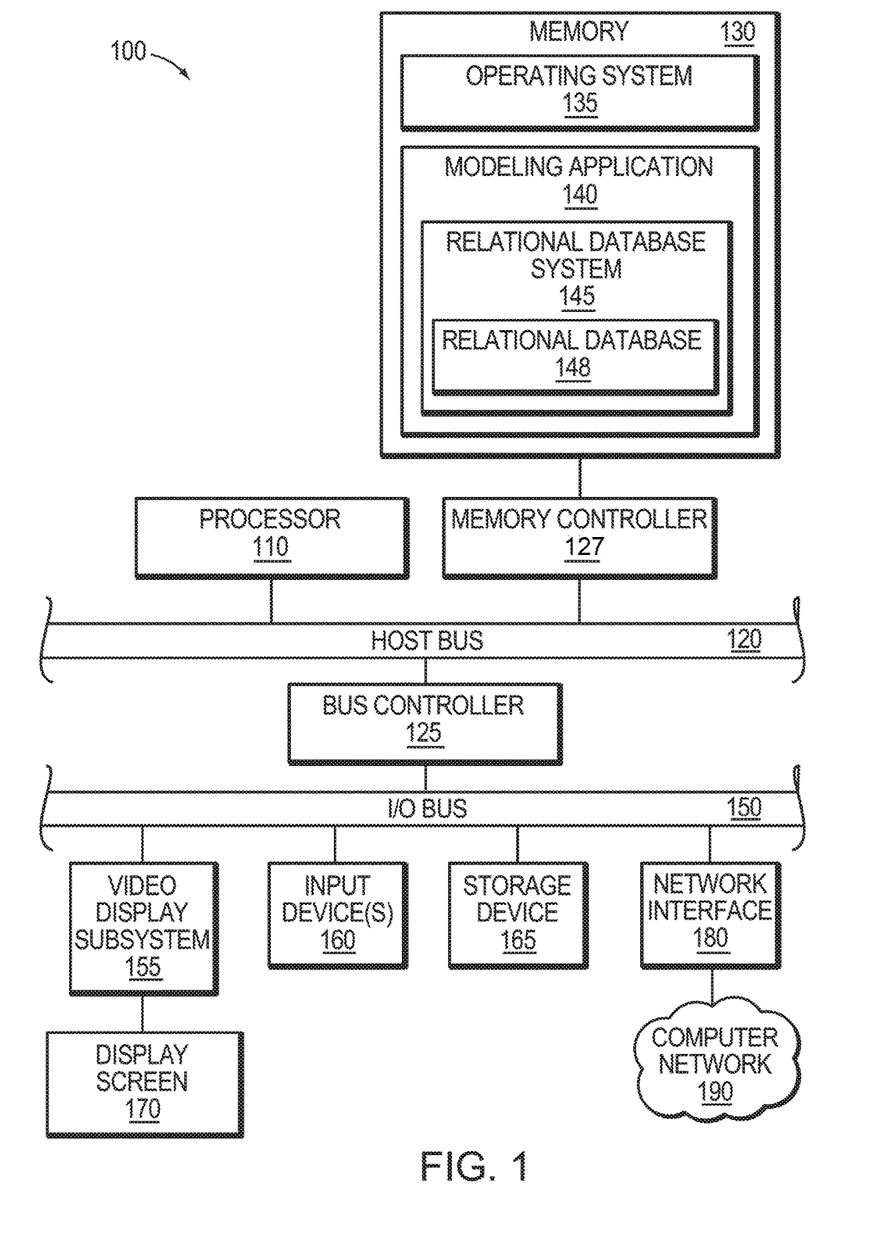
FIG. 1 is a block diagram of an example electronic device that may be used with the techniques discussed herein.

FIG. 1 is a block diagram of an example electronic device that may be used with the techniques discussed herein. The electronic device may be designed for stationary operation (e.g., may be a desktop computer), or for portable operation (e.g., may be a tablet computer, a notebook computer, a smartphone, a personal digital assistant (PDA), or other device designed to be transported by a user and utilized from a variety of different locations). The electronic device 100 includes at least one processor 110, such as an x86 processor, coupled to a host bus 120. A volatile memory 130, such as a Random Access Memory (RAM), is coupled to the host bus 120 via a memory controller 127. The memory 130 is configured to store at least a portion of executable instructions for an operating system (OS) 135, a modeling application 140, and a relational database system 145. The modeling application 140 may allow a user to create, view and execute a model of an engineered system (i.e., a physical system created through engineering design). In one implementation, the modeling application 140 is a hydraulic modeling application that models hydraulic systems, such as water distribution networks, wastewater collection networks, etc. For example, the modeling application may be the WaterCAD® V8i water distribution modeling application available from Bentley Systems, Inc., the WaterGEMS® V8i water distribution modeling application available from Bentley Systems, Inc., the HAMMER® V8i transient analysis and water hammer modeling application also available from Bentley Systems, Inc., or another similar software package. Alternatively, the modeling application 140 may be an application that is adapted to model other types of engineered systems, for example, buildings, bridges, factories, power systems, road systems, rail and transit systems, etc. While certain examples involving hydraulic systems are discussed below, it should be understood that the techniques are equally applicable to other types of systems.

The relational database system 145 may be a Structured Query Language (SQL) database system or another type of database system, which maintains a relational database 148 (e.g., a SQL database) that is structured according to a schema. As explained below, the schema may arrange the database so that elements and alternatives directly reference parameter values stored in a unitized data store. The relational database system 145 may be a self-contained programming library embedded into the modeling application 140. Alternatively, the relational database system 145 may exist as a separate process or application that is accessed by the modeling application 140.

The host bus 120 of the electronic device 100 is coupled to an input/output (I/O) bus 150 through a bus controller 125. A video display subsystem 155 includes a display screen 170 and hardware to drive the display screen. The video display subsystem 155 is coupled to the I/O bus 150. The display screen 170, among other functions, may show a user interface of the modeling application 140. One or more input devices 160, such as a keyboard, mouse, touchpad, etc., are provided and used to interact with the electronic device 100, and the applications executed on it, such as the modeling application 140. A persistent storage device 165, such as a hard disk drive, a solid-state drive, or other type or device, is coupled to the I/O bus 150, and may persistently store executable instructions that are available to be loaded to the volatile memory 130 when needed. For example, executable instructions for the operating system 135, the modeling application 140, and the relational database system 145 may be stored in the persistent storage device 165. The I/O bus 150 is further coupled to a network interface 180 that interfaces with a computer network 190, such as the Internet. The computer network 190 may allow communication between the electronic device 100 and other devices, to enable a collaborative, distributed, and/or remote computing arrangements.

Figure 2:
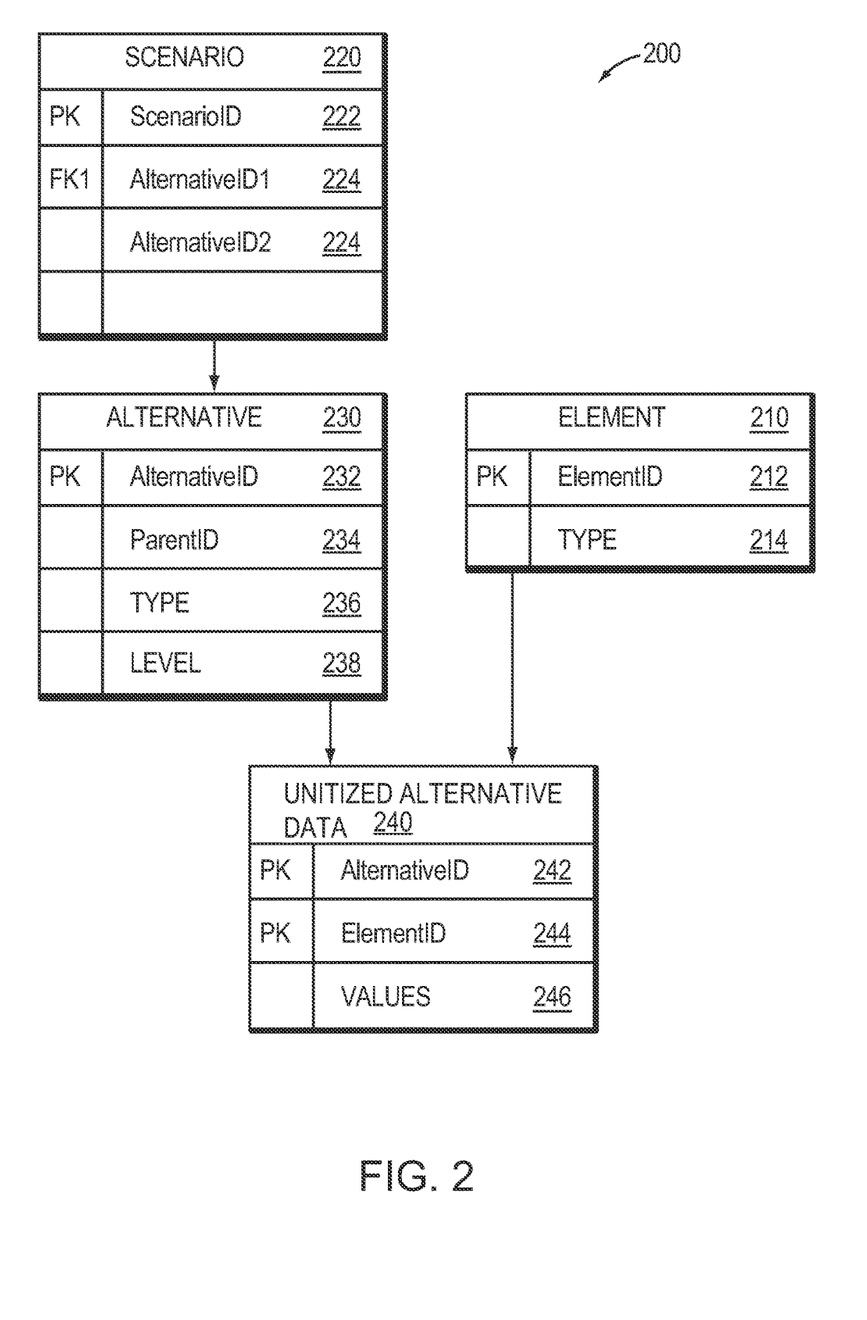
FIG. 2 is a diagram illustrating an example schema that may be used by a relational database to store elements of a system model and scenarios based on alternatives, where the elements and alternatives directly reference parameter values stored in a unitized data store.

FIG. 2 is a diagram 200 illustrating an example schema that may be used by the relational database 148 to store elements of a system model and scenarios based on alternatives, where the elements and alternatives directly reference parameter values stored in a unitized data store. The system model is composed of a collection of elements that represent portions of the engineered system. In the case of a hydraulic system, an element may represent a pipe, a pump, a valve, a storage tank, a junction, etc. For other types of engineered systems, an element may represent other types of components appropriate for the type of system being modeled. The collection of elements are stored in element table 210. The element table 210 includes an element ID column 212 that stores element IDs that each uniquely identify an element, and an element type column 214 that stores type indicators that each indicate a type to which an element belongs. The element ID column 212 serves as the primary key of the element ID table 210.

The system model, and its elements, is generally defined by a number of parameters that describe aspects of the topology, physical properties, demands, initial settings, and the like. For example, in the case of an element representing a pipe, parameter values may define things such as the diameter of the pipe, the length of the pipe, composition of the pipe, friction characteristics, temperature dependencies, etc. A user may desire to test a "what if" case where certain parameter values are changed, and other maintained the same, and the system model executed to evaluate the impact of the changes.

To enable efficient evaluation of "what if" cases, the example schema may employ "scenarios" composed of "alternatives" based on "facets" that reference the parameter values. As used herein, the term "facet" refers to a single orthogonal dimension of a modeling problem that defines a set of related parameters. For example, in the case of a hydraulic system, one facet may be pipe size. Further, as used herein, the term "alternative" refers to a structure indicating parameter values for a single facet. Multiple alternatives may exist that provide different potential values for the facet. For example, in the case of the facet of pipe size, a first alternative may indicate that a particular pipe element has a diameter of 6 inches. A second alternative may indicate that the particular pipe element has a diameter of 4 inches. Finally, as used herein, the term "scenario" refers to a structure indicating a set of parameter values that provides a value for each facet. A scenario indicates one alternative for each facet, and thereby indicates a set of parameter values sufficient to permit execution of a system model.

In the example schema of FIG. 2, the scenarios, alternatives, and parameter values are maintained respectively in a scenario table 220, an alternative table 230, and a unitized data store referred to as a unitized alternative data table 240. The scenario table 220 includes a scenario ID column 222 that identifies the scenario, and serves as a primary key for the scenario table 220. The scenario table 220 also includes a number of alternative ID columns 224, one for each facet, which store alternative IDs. Each alternative ID may serve as a foreign key, matching the primary key of the alternative table 230, and thereby enable referencing into that table. A scenario is created by associating a scenario ID with a particular set of alternative IDs. Multiple different scenario IDs may be associated with some of the same alternative IDs, allowing different scenarios to share alternatives for some facets.

The alternative table 230 includes an alternative ID column 232 that stores alternative IDs that serve as a primary key of the alternative table 230. The alternative table 230 also includes an alternative type column 236, a parent ID column 234, and a level column 238. The alternative type column 236 stores an alternative type for each alternative that indicates a facet to which the alternative corresponds. The parent ID column 234 stores a parent identifier for each alternative and is used to define a parent-child relationship among certain alternatives, such that alternatives may be arranged in an alternative hierarchy. In addition, the level ID column 238 stores a level ID for each alternative that indicates a level in the alternative hierarchy for the alternative. The level ID may be updated (by application code of the modeling application 140 or by a database trigger of the relational database system 145) as alternatives are added, moved, or deleted from the alternative table 230, to reflect the present level of the alternative in the alternative hierarchy.

The unitized alternative data table 240 includes an alternative ID column 242 that stores alternate IDs, and an element ID column 244 that stores element IDs. Collectively alternative IDs and element IDs form alternative ID-element ID pairs that serve as a composite primary key for the alternative data table 240. A values column 246 stores values for parameters, with the values in each row corresponding to a respective alternative ID-element ID pair in that row. The storage of the values is unitized in that they are all stored together, in a non-duplicative manner, and used by various alternatives. The values used by each alternative are accessed via an alternative ID-element ID pair.

By structuring the relational database 148 in this manner, parameter values may be efficiently shared, and the footprint consumed in memory 130 by the relational database 148 may be minimized. Parameter values that are common among different scenarios may be shared by the scenarios simply by referencing the same alternative. Further, parameter values that are common among different alternatives may be shared through inheritance among alternatives in the alternative hierarchy.

As discussed above, based on the value of the parent ID in alternative table 230, alternatives are organized in an alternative hierarchy structured according to parent-child relationships. Alternatives that have no parent in the alternative hierarchy (referred to herein as "base alternatives") generally reference all their own parameter values, via an alternative ID-element ID pair referencing into the unitized alternative data table 240. However, child alternatives that have parents in the alternative hierarchy typically do not need to reference all their own parameter values. Instead, they may inherit parameter values from a parent alternative. A child alternative that inherits at least one parameter value may be referred to herein as an "inherited alternative". Inherited alternatives may reference only parameter values that differ from those of a parent alternative. Such differing parameter values (referred to herein as "local data") are used in place of any conflicting parameter values accessible via a parent alternative (referred to herein as "inherited data").

In the example schema of FIG. 2, use of inherited data may be inferred, rather than explicitly indicated by an intermediary table (e.g., an alternative record table) located between the alternative table 230 and the unitized alternative data table 240 in the relational database 148. Where an alternative ID-element ID pair is present in the unitized alternative data table 240, corresponding parameter values (i.e. local data) is used. Where an alternative ID-element ID pair is absent from the unitized alternative data table 240, parameter values from a parent alternative (i.e. inherited data) is used.

By structuring the relational database 148 in the above described manner, memory consumption of an intermediary table (e.g., alternative record table) located between the alternative table 230 and the unitized alternative data table 240, may be avoided. Further, insertion performance may be improved since there are no intermediary table to require database insertion operations to update. Further, by introduction of a level tracking mechanism (embodied in the level column 238), bulk-data retrieval may be performed efficiently, for example, using a single query, as discussed in more detail below.

Figure 3:
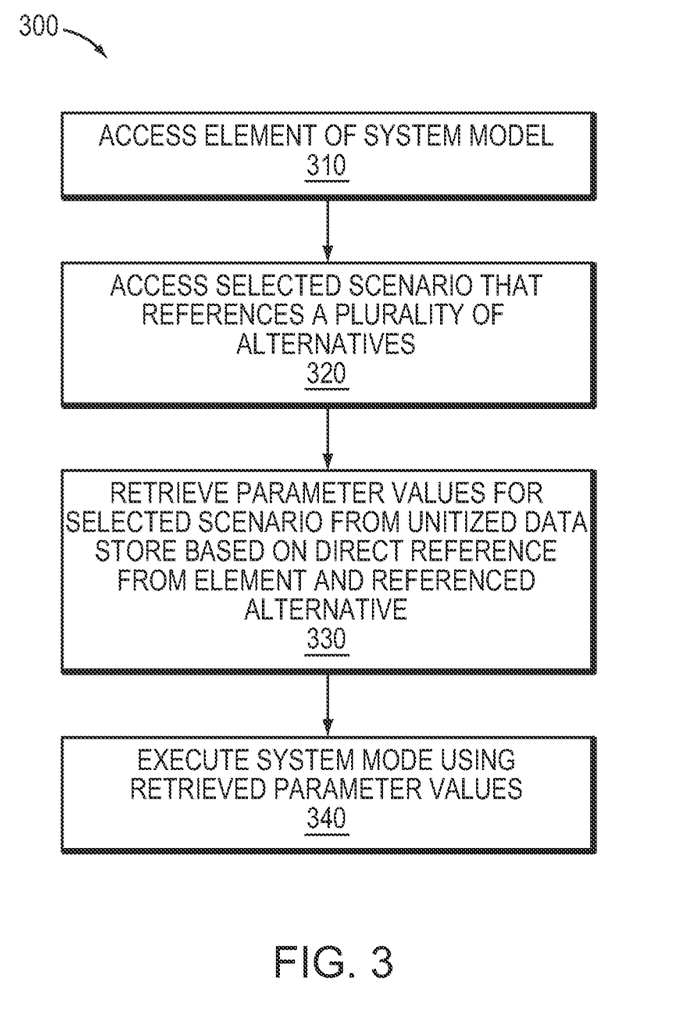
FIG. 3 is a flow diagram of an example generalized sequence of steps for utilizing a relational database built according to the example schema illustrated in FIG. 2.

FIG. 3 is a flow diagram of an example generalized sequence of steps for utilizing a relational database built according to the example schema illustrated in FIG. 2. At step 310, the relational database system 145, under direction of the modeling application 140, accesses an element of the system model. As mentioned above, the element may be stored in the element table 210, and the relational database system 145 may access a row of the element table 210 having an element ID column 212 and an element type column 214. At step 320, the relational database system 145 accesses a selected scenario that references a plurality of alternatives, selected from among a larger plurality of the alternatives. More specifically, the relational database system 145 may access a row of the scenario table 220 that has a scenario ID column 222 and alternative ID columns 224. Using the alternative ID in the row, the relational database system 145 may reference a row of the alternative table 230 having an alternative ID column 232, parent ID column 232, type column 236 and level column 238. At step 330, the relational database system 145 retrieves parameter values for the selected scenario from a unitized data store (the unitized data table 240) based on a direct reference from the element of the system model and a referenced alternative of the selected scenario. More specifically, the relational database utilizes an alternative ID-element ID pair to reference a row of the unitized data table 240 having a values column 246. Parameter values for the row are retrieved. At step 340, the modeling application 140 executes the system model using the retrieved parameter values.

While selected parameter values may be retrieved, as discussed above, in some cases it may be desirable to retrieve parameter values in bulk. For example, it may be desirable to retrieve parameter values for all elements of a same type for a certain alternative. Alternatively, it may be desirable to to retrieve parameter values for all elements of a same type for a certain alternative which are also filtered and/or sorted. Likewise, it may be desirable to retrieve parameter values for all elements of a number of types for a number of different alternatives. Use of a relational database built according to the schema illustrated in FIG. 2 may enable such bulk data retrieval operations to be performed with a single relational database query operation (e.g., a single SQL query).

Figure 4:
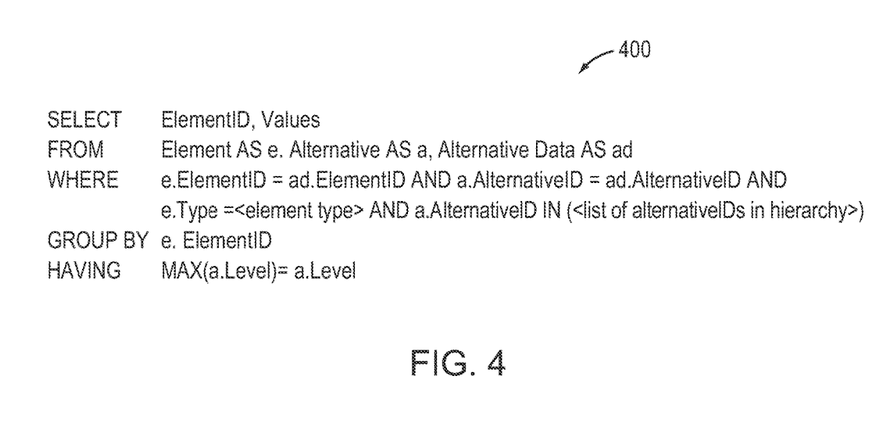
FIG. 4 is an example relational database query (e.g., Structured Query Language (SQL) query) that may be used to retrieve parameter values for all elements of a same type for a certain alternative.

FIG. 4 is an example relational database query (e.g., SQL query) 400 that may be used to retrieve parameter values for all elements of a same type for a certain alternative. The query 400, when executed by the relational database system 145, selects an element ID and parameter values from the element table 210 (aliased as "e"), the alternative table 230 (aliased as "a"), and the unitized alternative data table 240 (aliased as "ad"), where specific criteria are met. These criteria include the element type in the element table 210 being a certain type (represented by the placeholder "<element type>"), and the alternative ID being found in a list of alternatives in the alternative-hierarchy (represented by the placeholder "<list of alternatives in hierarchy>"). The list of alternatives represents the alternatives in a path from an alternative of interest up the hierarchy until a base alternative is encountered, such that parameter values from any higher level alternative may be captured. The list of alternatives may be pre-computed and cached, or computed by an extended relational database (e.g., SQL) function. The results are grouped according to the element ID of the element table 210 and restricted based on level, such that the parameter values returned are from the child-most alternatives in the alternative hierarchy.

Figure 5:
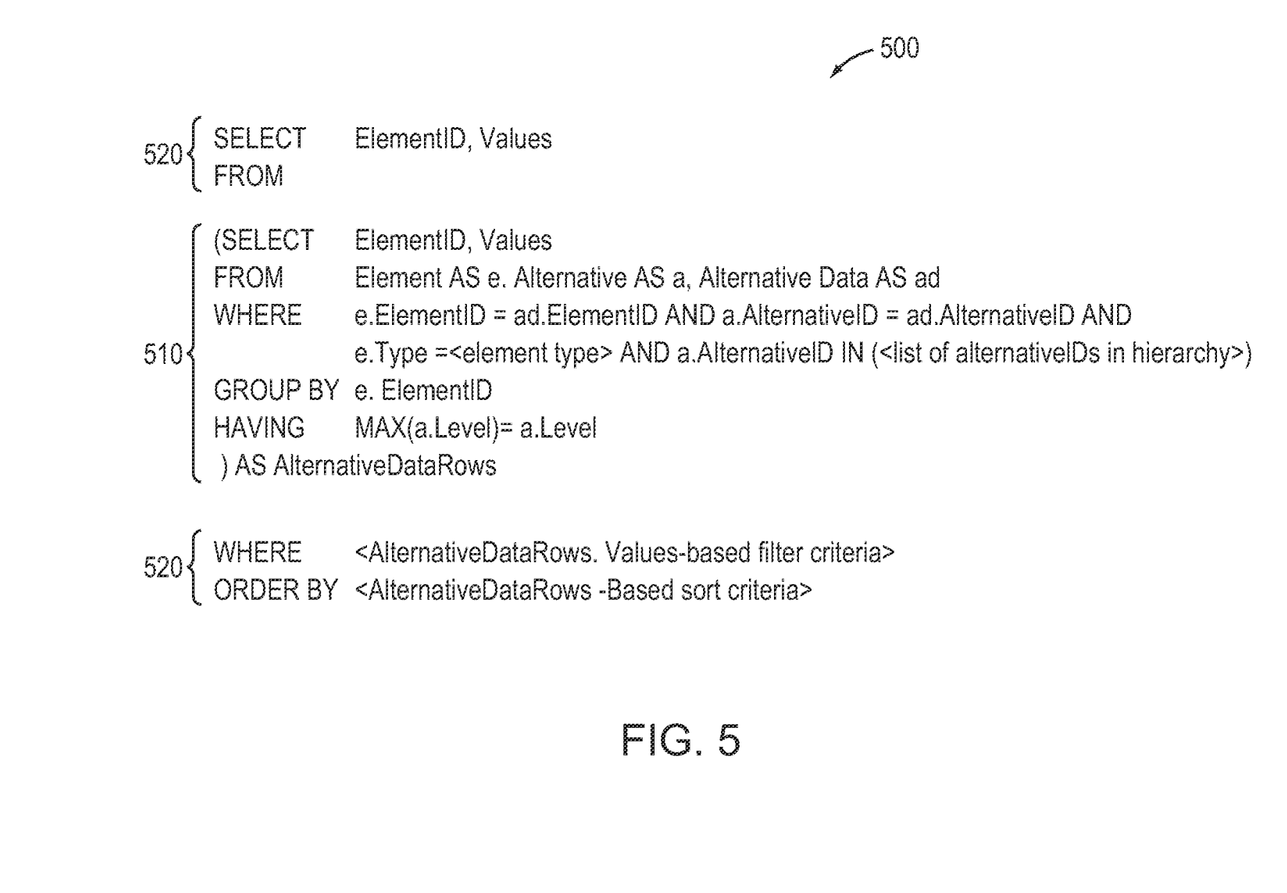
FIG. 5 is an example relational database query (e.g., a SQL query) that may be used to retrieve parameter values for all elements of a same type for a certain alternative, which are also filtered and sorted.

FIG. 5 is an example relational database query (e.g., a SQL query) 500 that may be used to retrieve parameter values for all elements of a same type for a certain alternative, which are also filtered and sorted. The relational database query is structured as a nested selection. An inner selection 510 retrieves grouped parameter values in a manner similar to the query 400 shown in FIG. 4, the result being aliased as "AlternativeDataRows". An outer selection 520 selects an element ID and parameter values from the aliased results of the inner nested selection ("AlternativeDataRows") where the parameter values of such results meet certain filtering criteria (represented by the placeholder "<AlternativeDataRows.Values-based filter criteria>"). These filtered results are then sorted based on sorting criteria (represented by the placeholder "<AlternativeDataRows-based sort criteria>")

Figure 6:
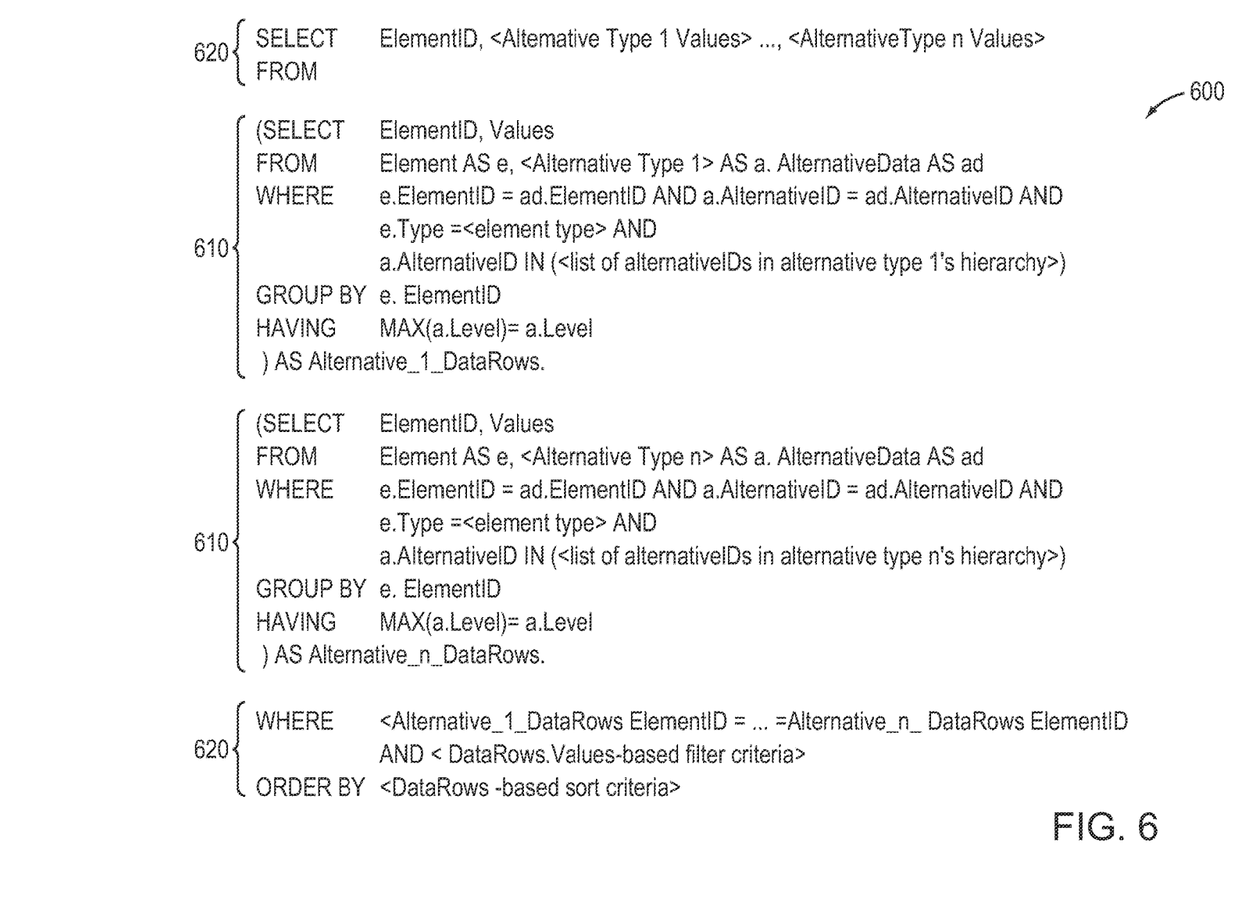
FIG. 6 is an example relational database query (e.g., a SQL query) that may be used to retrieve parameter values for a number of different types of alternatives.

FIG. 6 is an example relational database query (e.g., a SQL query) 600 that may be used to retrieve parameter values for a number of different types of alternatives. The relational database query is structured as a nested selection with multiple inner selections 610-620. The multiple inner selections 610 each retrieve grouped parameter values for a particular type of alternative in a manner similar to the query 400 of FIG. 4, with the results being aliased as "Alternative_1_DataRows" to "Alternative_n_DataRows", where n is the number of alternative types being considered. An outer selection 620 selects an element ID and parameter values (represented by the placeholders "<Alternative Type 1 Values>" to "Alternative Type n Values>") from the aliased results of the inner nested selections ("Alternative_1_DataRows" to "Alternative_n_DataRows"), where parameter values meet certain filtering criteria (represented by the placeholder "<DataRows.Values-based filter criteria>"). These filtered results are sorted based on sorting criteria represented by the placeholder "<DataRows-based sort criteria>").

In summary, the above description describes a technique for storing elements of a system model and scenarios based on alternatives, where the elements and alternatives directly reference parameter values stored in a unitized data store. While example embodiments are shown, it should be understood that a wide variety of modifications and/or additions may be made without departing from the disclosure's intended spirit and scope.

While certain terminology may be used that is most commonly associated with SQL, it should be understood that the techniques are applicable to a variety of other types of relational databases, and alternative terminology may be substituted. For example, where "rows" are referred to it should be understood that the techniques are applicable to "tuples" or "records", where "columns" are referred to it should be understood that the techniques are applicable to "attributes" or "fields", where "tables" are referred to it should be understood that the techniques are applicable "relations", etc.

Further, it should be understood that operations described above may be performed in different combinations of software and hardware. Software may include processor-executable instructions that implement applications stored in a non-transitory computer-readable medium, such as a volatile or persistent memory device, a hard-disk, a compact disk (CD), etc. Hardware may include processors, memory chips, programmable logic circuits, application specific integrated circuits, and/or other types of hardware components.

In general, it should be understood that all of the above descriptions are of example embodiments.

What is claimed is:

1. A method comprising:

accessing, in a relational database maintained in a memory of an electronic device, elements of a system model that models an engineered system, each element representing a portion of the engineered system and identified by an element identifier (ID) that uniquely identifies the respective element;

accessing, in the relational database, a selected scenario that references a plurality of alternatives that exist among a larger plurality of alternatives organized according to an alternative hierarchy, each alternative indicating parameter values for a single facet of a modeling problem embodied in the system model and identified by an alternative ID that uniquely identifies the alternative, each alternative further maintaining an explicit indication of a level in the alternative hierarchy to which the respective alternative belongs;

performing a bulk-data retrieval of parameter values for the elements from a unitized data store in the relational database, the bulk-data retrieval to include a database query that specifies at least a list of alternative IDs for one or more alternatives of the selected scenario used in an alternative ID-element ID pair that provides a direct reference into the unitized data store, the database query restricting results based on a maximum level of the alternative hierarchy such that retrieved parameter values are from child-most alternatives of the alternative hierarchy; and using the retrieved parameter values, by a modeling application, to execute the system model.

2. The method of claim 1, wherein the bulk-data retrieval is structured as a single database query.

3. The method of claim 2, wherein the list of alternatives includes a selected alternative and alternatives in higher levels of the alternative hierarchy up to a base alternative of the alternative hierarchy.

4. The method of claim 1, wherein the elements are maintained in an element table and are each associated with an element type of a plurality of element types that each indicate a general category to which an element belongs.

5. The method of claim 1, wherein the selected scenario is maintained in a scenario table, the scenario table storing scenario identifiers (IDs) that each uniquely identify a scenario, and, related to each scenario ID, a number of alternative IDs that indicate alternatives represented in the scenario.

6. The method of claim 1, wherein the one or more alternatives are maintained in an alternative table and are each associated with an alternative type of a plurality of alternative types that indicate facets to which the respective alternative corresponds.

7. The method of claim 6, wherein the indication of a level is a level identifier (ID) and the alternative table further stores the level IDs that each indicate a level in the alternative hierarchy to which an alternative belongs.

8. The method of claim 7, wherein the alternative table further stores parent identifiers (IDs) that each indicate a parent of an alternative in the alternative hierarchy.

9. The method of claim 1, wherein the engineered system is a hydraulic system, the modeling application is a hydraulic modeling application, and at least some of the elements represent pipes, pumps, valves, storage tanks, or junctions.

10. The method of claim 1, wherein the relational database is a Structured Query Language (SQL) database.

11. A non-transitory computer-readable medium that includes instructions executable on a processor, the instructions, when executed, operable to:

access elements of a system model that models an engineered system, each element representing a portion of the engineered system and identified by an element identifier (ID) that uniquely identifies the respective element;

access a selected scenario that references a plurality of alternatives that exist among a larger plurality of alternatives organized according to an alternative hierarchy, each alternative indicating parameter values for a single facet of a modeling problem embodied in the system model and identified by an alternative ID that uniquely identifies the alternative, each alternative further maintaining an explicit indication of a level in the alternative hierarchy to which the respective alternative belongs;

perform a bulk-data retrieval of parameter values for the elements from a unitized data store, the bulk-data retrieval to include a database query that specifies at least a list of alternative IDs for one or more alternatives of the selected scenario used in an alternative ID-element ID pair that provides a direct reference into the unitized data store, the database query to restrict results based on a maximum level of the alternative hierarchy such that retrieved parameter values are from child-most alternatives of the alternative hierarchy; and use the retrieved parameter values to execute the system model.

12. The non-transitory computer-readable medium of claim 11, wherein the bulk-data retrieval is structured as a single database query.

13. The non-transitory computer-readable medium of claim 12, wherein the list of alternatives includes a selected alternative and alternatives in higher levels of the alternative hierarchy up to a base alternative of the alternative hierarchy.

14. The non-transitory computer-readable medium of claim 11, wherein the elements are maintained in an element table, and are each associated with an element type of a plurality of element types that each indicate a general category to which an element belongs.

15. The non-transitory computer-readable medium of claim 11, wherein the selected scenario is maintained in a scenario table, the scenario table storing scenario identifiers (IDs) that each uniquely identify a scenario, and, related to each scenario ID, a number of alternative IDs that indicate alternatives represented in the scenario.

16. The non-transitory computer-readable medium of claim 11, wherein the one or more alternatives are maintained in an alternative table and are each associated with an alternative type of a plurality of alternative types that indicate facets to which the respective alternative corresponds.

17. The non-transitory computer-readable medium of claim 16, wherein the indication of a level is a level identifier (ID) and the alternative table further stores level IDs that each indicate a level in the alternative hierarchy to which an alternative belongs.

18. The non-transitory computer-readable medium of claim 17, wherein the alternative table further stores parent identifiers (IDs) that each indicate a parent of an alternative in the alternative hierarchy.

19. An electronic device, comprising:
a display device;
a processor; and
a memory coupled to the processor and configured to store instructions for a modeling application and a relational database system that maintains a relational database, the instructions, when executed by the processor, being operable to:
access, in the relational database, elements of a system model that models an engineered system, each element and identified by an element identifier (ID),
access, in the relational database, a selected scenario that references a plurality of alternatives organized according to an alternative hierarchy, each alternative indicating parameter values for a single facet of a modeling problem embodied in the system model and identified by an alternative ID, each alternative further maintaining an explicit indication of a level in the alternative hierarchy to which the respective alternative belongs, perform a bulk-data retrieval of parameter values for the elements, the bulk-data retrieval to include a database query that specifies at least a list of alternative IDs for one or more alternatives from the selected scenario used in an alternative ID-element ID pair that provides a direct reference into the unitized data store, the database query to restrict results based on a maximum level of the alternative hierarchy such that retrieved parameter values are from child-most alternatives of the alternative hierarchy, use the retrieved parameter values to execute the system model, and display results from the execution of the system model on the display device.

20. The electronic device of claim 19, wherein the bulk-data retrieval is structured as a single database query.

* * * * *